United States Patent
Persson et al.

(10) Patent No.: US 11,945,439 B2
(45) Date of Patent: Apr. 2, 2024

(54) AD OR ADAS AIDED MANEUVERING OF A VEHICLE

(71) Applicant: VOLVO TRUCK CORPORATION, Gothenburg (SE)

(72) Inventors: Daniel Persson, Gothenburg (SE); Agneta Sjögren, Hovås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/904,612

(22) PCT Filed: Feb. 27, 2020

(86) PCT No.: PCT/EP2020/055183
§ 371 (c)(1),
(2) Date: Aug. 19, 2022

(87) PCT Pub. No.: WO2021/170242
PCT Pub. Date: Sep. 2, 2021

(65) Prior Publication Data
US 2023/0112318 A1   Apr. 13, 2023

(51) Int. Cl.
*B60W 30/18* (2012.01)
*B60W 50/00* (2006.01)
*G06F 17/17* (2006.01)

(52) U.S. Cl.
CPC .. *B60W 30/18036* (2013.01); *B60W 50/0098* (2013.01); *G06F 17/17* (2013.01);
(Continued)

(58) Field of Classification Search
CPC ....... B60W 30/18036; B60W 50/0098; B60W 2050/0028; B60W 2420/42;
(Continued)

(56) References Cited

U.S. PATENT DOCUMENTS

2003/0163281 A1* 8/2003 Yang .................... H04N 19/134
  348/E5.066
2011/0254978 A1* 10/2011 Yamaji .................... G01S 19/48
  348/231.3
(Continued)

FOREIGN PATENT DOCUMENTS

CN   108535756 A   9/2018
DE   102005058628 B4   10/2015
(Continued)

OTHER PUBLICATIONS

Machine translation of KR20190040573A downloaded from Espacenet. (Year: 2023).*
(Continued)

*Primary Examiner* — Peter D Nolan
*Assistant Examiner* — Tanya C Sienko
(74) *Attorney, Agent, or Firm* — Venable LLP; Jeffri A. Kaminski

(57) ABSTRACT

There is provided mechanisms for AD, or at least ADAS, aided manoeuvring of a vehicle. A method includes selecting between using a CRLS based positioning system and a GNSS based positioning system for aiding manoeuvring of the vehicle. Which positioning system to select is based on comparing a first error determined for the CRLS based positioning system to a second error determined for the GNSS based positioning system. The positioning system with smallest error is selected. The method comprises aiding the manoeuvring of the vehicle using the selected positioning system. The manoeuvring pertains to reversing of the vehicle.

14 Claims, 3 Drawing Sheets

(52) U.S. Cl.
CPC . *B60W 2050/0028* (2013.01); *B60W 2420/42* (2013.01); *B60W 2420/52* (2013.01); *B60W 2420/54* (2013.01); *B60W 2556/20* (2020.02); *B60W 2556/60* (2020.02)

(58) Field of Classification Search
CPC ......... B60W 2420/52; B60W 2420/54; B60W 2556/20; B60W 2556/60; G06F 17/17
See application file for complete search history.

(56) References Cited

U.S. PATENT DOCUMENTS

| | | | |
|---|---|---|---|
| 2012/0174445 A1* | 7/2012 | Jones | G01S 19/53 37/197 |
| 2015/0088360 A1* | 3/2015 | Bonnet | B62D 15/027 701/23 |
| 2016/0061612 A1 | 3/2016 | You et al. | |
| 2016/0273921 A1 | 9/2016 | Zhou et al. | |
| 2016/0368336 A1 | 12/2016 | Kahn et al. | |
| 2017/0124862 A1 | 5/2017 | Sakai et al. | |
| 2019/0041869 A1 | 2/2019 | Shao et al. | |
| 2019/0094333 A1* | 3/2019 | Va | G01S 7/023 |
| 2019/0114911 A1* | 4/2019 | Rezaei | G01S 5/16 |
| 2019/0265041 A1 | 8/2019 | Merfels et al. | |
| 2020/0031352 A1* | 1/2020 | Takaki | B60W 60/0015 |
| 2022/0373335 A1* | 11/2022 | Kim | G05D 1/0274 |
| 2022/0410914 A1* | 12/2022 | Na | G05D 1/0293 |

FOREIGN PATENT DOCUMENTS

| | | | | |
|---|---|---|---|---|
| KR | 20190040573 A | * | 4/2017 | ............. G01S 19/03 |
| KR | 20190040573 A | | 4/2019 | |
| WO | 18063245 A1 | | 4/2018 | |

OTHER PUBLICATIONS

"Availability, Reliability and Accuracy of GPS Signal in Bandar Baru Bangi for the Determination of Vehicle Position and Speed" by I. Mohamad et al., Proceeding of the 2009 International Conference on Space Science and Communication Oct. 26-27, 2009, Port Dickson, Negeri Sembilan, Malaysia (Year: 2009).*
"Fast Algorithm for Robust Template Matching With M-Estimators" Jiun-Hung Chen et al., IEEE Transactions on Signal Processing, vol. 51, No. 1, Jan. 2003 (Year: 2003).*
"Research on Adaptive Kalman filter Algorithm based on Fuzzy neural network" Zhen Shi et al., Proceedings of the 2010 IEEE International Conference on Information and Automation Jun. 20-23, Harbin, China (Year: 2010).*
"A Comparative Performance Analysis of Position Estimation Algorithms for GNSS Localization in Urban Areas", Bassma Guermah et al., 2016 International Conference on Advanced Communication Systems and Information Security (ACOSIS) (pp. 1-7) (Year: 2016).*
"MAP Aided Self-positioning Based on LIDAR Perception for Autonomous Vehicles" Rong-Terng Juang 2019 4th Asia-Pacific Conference on Intelligent Robot Systems (Year: 2019).*
"Adaptive Rood Pattern Search for Fast Block-Matching Motion Estimation" Y. Nie et al., IEEE Transactions on Image Processing, vol. 11., No. 12, Dec. 2002. (Year: 2002).*
"Least Squares Techniques for GPS Receivers Positioning Filter using Pseudorange and Carrier Phase Measurements", M.R. Mosavi et al., Iranian Journal of Electrical and Electronic Engineering • Mar. 2014 (Year: 2014).*
International Search Report and Written Opinion in corresponding International Application No. PCT/EP2020/055183 dated Oct. 28, 2020 (15 pages).

* cited by examiner

AD OR ADAS AIDED MANEUVERING OF A VEHICLE

CROSS-REFERENCE TO RELATED APPLICATIONS

This application is a U.S. National Stage application of PCT/EP2020/055183, filed Feb. 27, 2020 and published on Sep. 2, 2021, as WO 2021/170242, all of which is hereby incorporated by reference in its entirety.

TECHNICAL FIELD

Embodiments presented herein relate to a method, a controller, a computer program, and a computer program product for Autonomous Driving (AD) or Advanced Driver Assistance Systems (ADAS) aided maneuvering of a vehicle.

BACKGROUND

Difficult vehicle manoeuvres are associated with risk, both for vulnerable road users, vehicles, and cargo. Such manoeuvres can also be bottlenecks at terminals and hinder efficiency, and further be difficult even for experienced drivers. Vehicles are typically multi-articulation angle combinations, which further increase manoeuvre difficulty. In recent years vehicle manufacturers have therefore invested resources in researching advanced motor vehicle driving assistance/aid systems, such as AD or ADAS, to improve driving safety and comfort.

AD and ADAS safety features are designed to avoid collisions and accidents by offering technologies that warn drivers of potential problems, or to avoid collisions by implementing safeguard measures and taking control of the motor vehicles. Adaptive features can automate lighting, provide adaptive cruise control, automate braking, incorporate positioning signalling, traffic signalling, connect smartphones, alert drivers of other motor vehicles of hazards, keep drivers in the right lane, or show what is in blind spots. AD and ADAS technology is based on vision/camera systems, sensory systems, automotive data networks, vehicle-to-vehicle (V2V) or vehicle-to-infrastructure (V2I) communication systems.

Both AD systems and ADAS might be aided by positioning information. There could be different ways for AD systems and ADAS to obtain such positioning information. However, depending on by means of which type of positioning system the positioning information is obtain, the positioning information might be more or less accurate. Further, the accuracy of the used positioning system might change, depending on different conditions.

Hence, there is still a need for improved AD or ADAS aided manoeuvring of a vehicle.

SUMMARY

An object of embodiments herein is to provide efficient AD or ADAS aided manoeuvring of a vehicle, especially in terms of AD systems and ADAS being aided by accurate positioning information.

According to a first aspect there is presented a method for AD, or at least ADAS, aided manoeuvring of a vehicle. The method comprises selecting between using a CRLS based positioning system and a GNSS based positioning system for aiding manoeuvring of the vehicle. Which positioning system to select is based on comparing a first error determined for the CRLS based positioning system to a second error determined for the GNSS based positioning system. The positioning system with smallest error is selected. The method comprises aiding the manoeuvring of the vehicle using the selected positioning system. The manoeuvring pertains to reversing of the vehicle.

According to a second aspect there is presented a controller for AD, or at least ADAS, aided manoeuvring of a vehicle. The controller comprises processing circuitry. The processing circuitry is configured to cause the controller to select between using a CRLS based positioning system and a GNSS based positioning system for aiding manoeuvring of the vehicle. Which positioning system to select is based on comparing a first error determined for the CRLS based positioning system to a second error determined for the GNSS based positioning system. The positioning system with smallest error is selected. The processing circuitry is configured to cause the controller to aid the manoeuvring of the vehicle using the selected positioning system. The manoeuvring pertains to reversing of the vehicle.

According to a third aspect there is presented a controller for AD, or at least ADAS, aided manoeuvring of a vehicle. The controller comprises a select module configured to select between using a CRLS based positioning system and a GNSS based positioning system for aiding manoeuvring of the vehicle. Which positioning system to select is based on comparing a first error determined for the CRLS based positioning system to a second error determined for the GNSS based positioning system. The positioning system with smallest error is selected. The controller comprises an aid module configured to aid the manoeuvring of the vehicle using the selected positioning system. The manoeuvring pertains to reversing of the vehicle.

According to a fourth aspect there is presented a computer program for AD, or at least ADAS, aided manoeuvring of a vehicle, the computer program comprising computer program code which, when run on a controller, causes the controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects enable improved AD or ADAS aided manoeuvring of the vehicle.

Advantageously, these aspects enable AD systems and ADAS to be aided by accurate positioning information.

Advantageously, these aspects enable selection of the positioning system that at any given time has highest accuracy.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION OF EXAMPLE EMBODIMENTS OF THE INVENTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
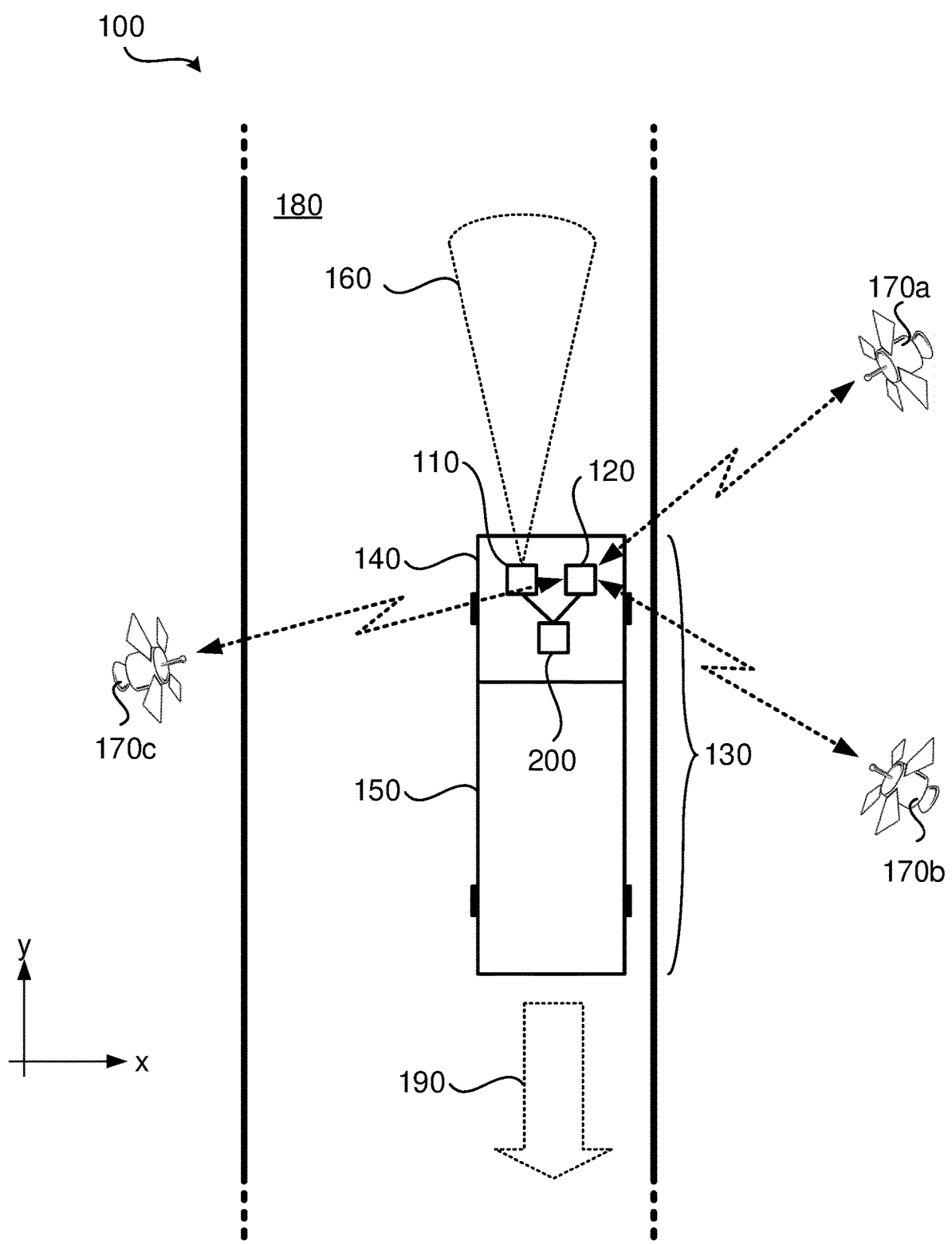
FIG. 1 is a schematic diagram illustrating an aerial viewpoint of a scenario where the herein disclosed embodiments apply.

FIG. 1 is a schematic diagram illustrating a simplified aerial viewpoint 100 of a scenario in an x-y coordinate system where the herein disclosed embodiments apply. FIG. 1 illustrates a scenario where a vehicle 130 comprising a cab 140 and a truck 150. The vehicle 130 travels along a path defined by a road 180. A set of manoeuvres are assumed to be performed by the vehicle 130, either initiated by the driver of the vehicle 130 or by AD, or at least ADAS aided manoeuvring of the vehicle 130 in order to keep the vehicle 130 on the road 180.

As noted above, there is still a need for improved AD or ADAS aided manoeuvring of a vehicle. In the illustrative example of FIG. 1 manoeuvring the vehicle 130 might seem straight-forward, especially if moving the vehicle 130 forward along the road 180. However, there could be other locations where manoeuvring of the vehicle 130 is more challenging, such as where the vehicle 130 is to be manoeuvred to an intended goal position that requires reversing of the vehicle 130 (as indicated by directional arrow 190) etc. Certain manoeuvres, such as reversing, are associated with risk, both for vulnerable road users (VRUs), the vehicle 130 itself, as well as any cargo transported by the vehicle 130. Difficult reversing manoeuvres might further represent bottlenecks at terminals and hinder efficiency. These manoeuvres might be difficult even for experienced drivers. Vehicles are typically multi-articulation angle combinations, which further increase reversing manoeuvre difficulty.

The manoeuvring of the vehicle 130 might therefore be dependent on positioning information as provided by one or more positioning systems. In the example of FIG. 1, the vehicle 130 comprises a Camera/Radar/Lidar/Sonar (CRLS) based positioning system 110 and a Global Navigation Satellite System (GNSS) based positioning system 120 for aiding manoeuvring of the vehicle 130.

Operation of the CRLS based positioning system 110 is based on emitting signals and receiving reflections of the signals as the signals are reflected by one or more physical objects. At 160 is schematically illustrated a simplified version of the signalling range of the CRLS based positioning system 110 and thus the region in which objects can be detected using the CRLS based positioning system 110. Operation of the GNSS based positioning system 120 is based on receiving and measuring on signals from satellites 170a, 170b, 170c.

An accurate positioning system 110, 120 might allow the vehicle 130 to apply sensor fusion, track recording, and control algorithms to reverse. Non-accurate positioning might cause manoeuvring, such as reversing, to malfunction by becoming unstable or not to follow the path well. The used positioning system should therefore be accurate and robust. In this respect, how the AD or ADAS is to use the positioning information as provided by the CRLS based positioning system 110 and the GNSS based positioning system 120 for aiding manoeuvring of the vehicle 130 is controlled by a controller 200. Further aspects relating to this will be disclosed below.

The embodiments disclosed herein therefore relate to mechanisms for AD or ADAS aided manoeuvring of a vehicle 130. In order to obtain such mechanisms there is provided a controller 200, a method performed by the controller 200, a computer program product comprising code, for example in the form of a computer program, that when run on a controller 200, causes the controller 200 to perform the method.

Figure 2:
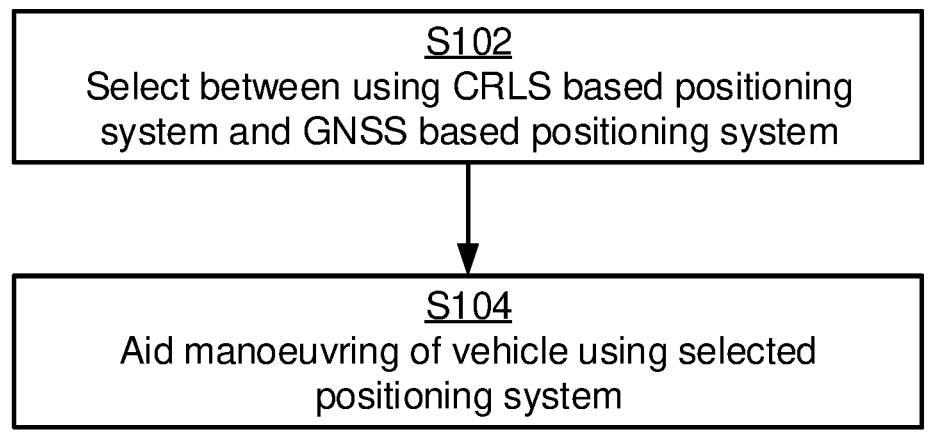
FIG. 2 is a flowchart of methods according to embodiments.

FIG. 2 is a flowchart illustrating embodiments of methods for AD or ADAS aided manoeuvring of a vehicle 130. The methods are performed by the controller 200. The methods are advantageously provided as computer programs 520.

S102: A selection is made between using the CRLS based positioning system 110 and the GNSS based positioning system 120 for aiding manoeuvring of the vehicle 130. Which positioning system to select is based on comparing a first error determined for the CRLS based positioning system 110 to a second error determined for the GNSS based positioning system 120. The positioning system 110, 120 with smallest error is selected.

In this respect, CRLS based positioning systems 110 and GNSS based positioning systems 120 often are complementary for providing accurate positioning information, such as in the following situations. In situations where there are comparatively many obstacles of physical objects in the vicinity of the vehicle 130, GNSS based positioning systems 120 might be suffering from satellite shadow and hence have low accuracy whereas CRLS based positioning systems 110 might have access to comparatively many visual cues on the nearby objects and hence have high accuracy. In situations where there are comparatively few obstacles of physical objects in the vicinity of the vehicle 130, GNSS based positioning systems 120 might have access to information to many satellites 170a:170c and hence have high accuracy whereas CRLS based positioning systems 110 might have access to comparatively few visual cues on the nearby few objects and hence have low accuracy.

S104: The manoeuvring of the vehicle 130 is aided using the selected positioning system 110, 120. The manoeuvring pertains to reversing of the vehicle 130.

Hence, there is proposed mechanisms for automatically switching between GNSS and CRLS based positioning systems, thus avoiding the severe GNSS and CRLS performance degradation problems.

Embodiments relating to further details of AD or ADAS aided manoeuvring of a vehicle 130 as performed by the controller 200 will now be disclosed.

Further aspects relating to the CRLS based positioning system 110 will now be disclosed.

There could be different types of errors of the CRLS based positioning system 110. In some embodiments, the first error is related to the minimum matching error between the position of the vehicle 130 as given by the CRLS based positioning system 110 before and after movement of the vehicle 130. In further detail, the first error might be determined by the least squares error resulting from a difference between a first distance pattern measured by the CRLS based positioning system 110 for a first position of the vehicle 130 and a distance pattern estimated by the CRLS based positioning system 110 for a second position of the vehicle 130.

One non-limiting example of how to determine the error of the CRLS based positioning system 110 will now be disclosed.

It is assumed that the vehicle 130 has a current position PC and a current heading HC. The CRLS based positioning system 110 emits a signal, such as a laser signal, and receives a reflection of the signal, such as reflected light, upon the signal having been reflected by an object. The round trip time for the signal with respect to the object is measured and from the round trip time a corresponding distance to the object is determined. This procedure is repeated by emitting the signal (and making corresponding measurements on the respective reflections) in different directions and thus obtaining a first distance pattern P1 for the surroundings at the current position.

It is further assumed that the vehicle 130 moves to a second position and that the above procedure is repeated for the second positions so as to obtain a second distance pattern P2 for the surroundings at the second position.

The pattern P2 is then matched to the pattern P1 and a position change vector D and a heading change vector H are found. First, a 0-based and a H-based transformation is added to each of the points in the second distance pattern P2 to achieve a pattern P2-DH. The difference, denoted err-CRLS, between the first distance pattern P1 and pattern P2-DH is then computed. The difference can be, e.g., a sum of pixel value differences. The procedure is then repeated for different values of D and H, and then updated, until a minimum value, denoted err-CRLS_LS, of err-CRLS is obtained. Denote by D* and H* the values of D and H that yields the minimum value err-CRLS_LS. The new position, denoted PN, of the vehicle 130 is then determined as PN=PC+D* and the new heading, denoted HN, of the vehicle 130 is determined as HN=HC+H*. In this respect, not only the numerical value of err-CRLS_LS might be recorded, but also other measurement values might be recorded, such as the number of visual cues err-CRLS_nr_of_cues, used in the CRLS based positioning system 110, etc. Thus, err-CRLS might comprise both err-CRLS_LS and err-CRLS_nr_of_cues.

Further aspects relating to the GNSS based positioning system 120 will now be disclosed.

There could be different types of errors of the GNSS based positioning system 120. In some embodiments, the second error is proportional to the minimum matching error of the position of the vehicle 130 as given by the GNSS based positioning system 120 for different satellites 170a, 170b, 170c utilized by the GNSS based positioning system 120. In further detail, the error is determined by the least squares error resulting from solving a trilateration problem of the GNSS based positioning system 120.

One non-limiting example of how to determine the error of the GNSS based positioning system 120 will now be disclosed.

Assume that each satellite 170a:170c as used by the GNSS based positioning system 120 emits a pseudorandom noise sequence (PRNS), information of the position of the satellite, and the transmission time of the satellite. Assume further that the GNSS based positioning system 120 detects the PRNSs. The GNSS based positioning system 120 then formulates and solves a trilateration problem. Trilateration can be done by any variants of the traditional time of arrival, or time difference of arrival techniques, as follows.

Values of the clock times corresponding to the detection of the PRNSs, the GNSS satellite transceivers' transmission times, and positions, are used as input to the trilateration problem. The clock offset of the GNSS based positioning system 120 can optionally be used as output from the trilateration problem. The solution to the trilateration problem then yields the position of the vehicle 130. The trilateration problem is solved by finding the position for which the estimation error err-GNSS is minimized, thus yielding the least squares error err-GNSS_LS. In order to solve the trilateration equations for N space dimensions and time, at least signals from N+1 satellites 170a:170c are needed if no historic or geometric constraint prior position information is supplied. In this respect, not only one numerical value of err-GNSS might be recorded, but also other measurement values might be recorded, such as the number of satellites 170a:170c, denoted err-GNSS_nr_of_satellites, used by the GNSS based positioning system 110, and the corresponding positions of the satellites 170a:170c used, etc. The heading of the vehicle 130 can be extracted by using two GNSS based positioning systems 120 with distanced antennas at the vehicle 130. If two such GNSS based positioning systems 120 are used for extracting the heading of the vehicle 130, the corresponding errors can be recorded. Thus, err-GNSS might comprise both err-GNSS_LS and err-GNSS_nr_of_satellites.

Further aspects relating to the errors of the CRLS based positioning system 110 and of the GNSS based positioning system 120 will be disclosed next.

In some aspects, the errors err-CRLS of the CRLS based positioning system 110 and err-GNSS of the GNSS based positioning system 120 are weighted by different weights. This includes weights for err-CRLS_LS, err-CRLS_nr_of_L_cues, err-GNSS_LS, and err-GNSS_nr_of_satellites. One non-limiting examples of how to determine whether err-CRLS or err-GNSS is largest (or smallest) will now be disclosed.

Define a function f, such that if f(err-CRLS, err-GNSS)>0, then the CRLS based positioning system 110 is selected and otherwise the GNSS based positioning system 120 is selected. Denote by w_err-CRLS_LS the weight for weighting err-CRL_LS. Denote by w_err-CRLS_nr_of_cues the weight for weighting err-CRL_nr_of_cues. Denote by w_err-GNSS_LS the weight for weighting err-GNSS_LS. Denote by w_err-GNSS_nr_of_satellites the weight for weighting err-GNSS_nr_of_satellites. Then according to an example:

$$f(\text{err-CRLS}, \text{err-GNSS}) = w\_\text{err-CRLS\_LS} \cdot \text{err-CRLS\_LS} + w\_\text{err-CRLS}\_nr\_of\_L\_\text{cues} \cdot \text{err-CRLS}\_nr\_of\_L\_\text{cues} + w\_\text{err-GNSS\_LS} \cdot \text{err-GNSS\_LS} + w\_nr\_of\_\text{satellites} \cdot \text{err-GNSS}\_nr\_of\_\text{satellites}.$$

The values of the parameters used by function f can be found using a training algorithm.

In particular, according to an embodiment, weights for weighting err-CRLS and for weighting the err-GNSS are found through training. In some aspects, the training involves simulating manoeuvring. That is, in some embodiments, the training involves simulating manoeuvring of the vehicle 130 using an error-free positioning system as reference and measuring how much the accuracy of the CRLS based positioning system 110 and the accuracy of the GNSS based positioning system 120 differ from the error-free positioning system. The manoeuvring might be simulated according to different scenarios with varying conditions for the CRLS based positioning system 110 and the GNSS based positioning system 120, respectively. The manoeuvring might be simulated by means of real-world experimenting.

One non-limiting examples of a training procedure for finding the values of the parameters used by function f will now be disclosed.

It is assumed that the GNSS based positioning system 120 in principle provides error-free positioning information. This could be the case for a test track in open air with excellent GNSS performance. Two GNSS based positioning systems are then used during the training; a partly satellite-shielded GNSS positioning system, and a reference GNSS-ref positioning system. The GNSS positioning systems might be RTK-enhanced (where RTK is short for Real-time kinematic).

Physical objects are then provided at the test track for enabling positioning of the vehicle 130 using the CRLS based positioning system 110. The vehicle 130 is manoeuvred along the test track and positioning information using the CRLS based positioning system 110 and the partly satellite-shielded GNSS positioning system is gathered.

The locations of the physical objects are altered, the shielding of the partly satellite-shielded GNSS positioning system is altered, and the vehicle 130 is again manoeuvred along the test track and positioning information using the CRLS based positioning system 110 and the partly satellite-shielded GNSS positioning system is again gathered. This procedure might be iterated for multiple alterations of the locations of the physical objects and shielding of the partly satellite-shielded GNSS positioning system in order to obtain multiple samples.

For each position of the vehicle 130 where positioning information is gathered it is checked whether the position given by the CRLS based positioning system 110 or by the partly satellite-shielded GNSS positioning system is more accurate by comparing to the true position as given by the reference GNSS-ref positioning system.

As an example, if for sample k, the CRLS based positioning system 110 is most accurate, set result_k=1, and otherwise set result_k=−1. Then minimize the sum over all samples sum_k (f(err-CRLS_k, err-GNSS_k)-result_k)^2 with respect to w_err-CRLS_LS, w_err-CRLS_nr_of_L_cues, w_err-GNSS_LS, and w_err-GNSS_nr_of_satellites. This yields the weights to be used in f(err-CRLS, err-GNSS).

The herein disclosed embodiments are applicable to any vehicle 130 and in particular to heavy-duty vehicles, such as trucks, buses and construction equipment, etc. In some embodiments, the vehicle 130 is a truck.

Figure 3:
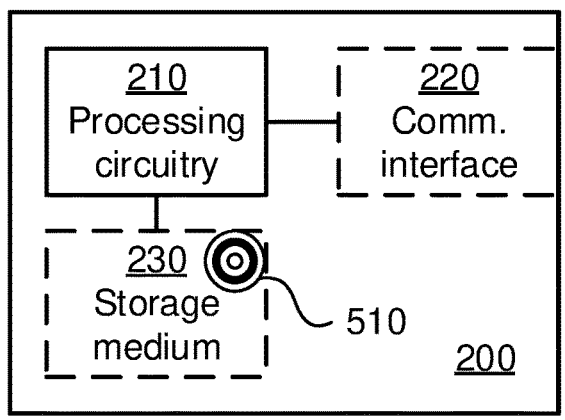
FIG. 3 is a schematic diagram showing functional units of a controller according to an embodiment.

FIG. 3 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 510 (as in FIG. 5), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with the vehicle 130, the CRLS based positioning system 110 and the GNSS based positioning system 120. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

Figure 4:
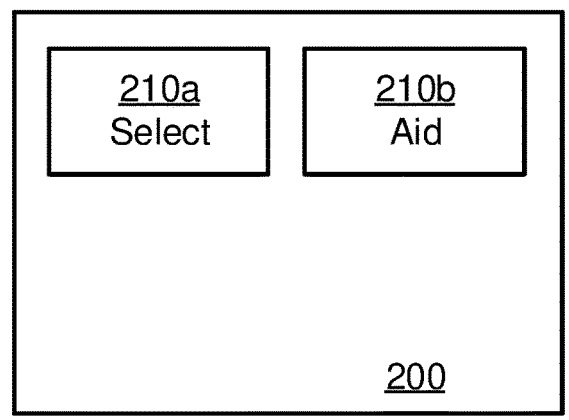
FIG. 4 is a schematic diagram showing functional modules of a controller according to an embodiment.

FIG. 4 schematically illustrates, in terms of a number of functional modules, the components of a controller 200 according to an embodiment. The controller 200 of FIG. 4 comprises a number of functional modules; a select module 210a configured to perform step S102, and an aid module 210b configured to perform step S104. The controller 200 of FIG. 4 may further comprise a number of optional functional modules. In general terms, each functional module 210a-210b may in one embodiment be implemented only in hardware and in another embodiment with the help of software, i.e., the latter embodiment having computer program instructions stored on the storage medium 230 which when run on the processing circuitry makes the controller 200 perform the corresponding steps mentioned above in conjunction with FIG. 4. It should also be mentioned that even though the modules correspond to parts of a computer program, they do not need to be separate modules therein, but the way in which they are implemented in software is dependent on the programming language used. Preferably, one or more or all functional modules 210a-210b may be implemented by the processing circuitry 210, possibly in cooperation with the communications interface 220 and/or the storage medium 230. The processing circuitry 210 may thus be configured to from the storage medium 230 fetch instructions as provided by a functional module 210a-210b and to execute these instructions, thereby performing any steps as disclosed herein.

Figure 5:
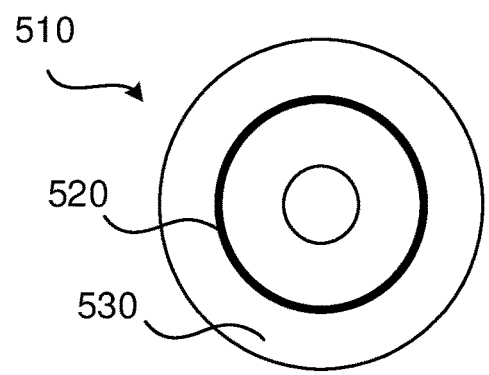
FIG. 5 shows one example of a computer program product comprising computer readable storage medium according to an embodiment.

FIG. 5 shows one example of a computer program product 510 comprising computer readable storage medium 530. On this computer readable storage medium 530, a computer program 520 can be stored, which computer program 520 can cause the processing circuitry 210 and thereto operatively coupled entities and devices, such as the communications interface 220 and the storage medium 230, to execute methods according to embodiments described herein. The computer program 520 and/or computer program product 510 may thus provide means for performing any steps as herein disclosed.

In the example of FIG. 5, the computer program product 510 is illustrated as an optical disc, such as a CD (compact disc) or a DVD (digital versatile disc) or a Blu-Ray disc. The computer program product 510 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 520 is here schematically shown as a track on the depicted optical disk, the computer program 520 can be stored in any way which is suitable for the computer program product 510.

The invention claimed is:

1. A method for Autonomous Driving, AD, or at least Advanced Driver Assisted System, ADAS, aided manoeuvring of a vehicle, comprising:
    selecting between using a Camera/Radar/Lidar/Sonar ("CRLS") based positioning system and a Global Navigation Satellite System ("GNSS") based positioning system for aiding manoeuvring of the vehicle, wherein which positioning system to select is based on comparing a first error determined for the CRLS based positioning system to a second error determined for the GNSS based positioning system, and wherein the positioning system with smallest error is selected, wherein the smallest error is selected by checking, for each position of the vehicle where positioning information is gathered, whether the position given by the CRLS based positioning system or the GNSS based positioning system is more accurate; and
    aiding the manoeuvring of the vehicle using the selected positioning system, wherein the manoeuvring pertains to reversing of the vehicle.

2. The method according to claim 1, wherein the first error has a first weighting and the second error has a second weighting.

3. The method according to claim 2, wherein the first error is weighted according to the number of visual cues used in the CRLS based positioning system.

4. The method according to claim 2, wherein the second error is weighted according to the number of available satellites used in the GNSS based positioning system and/or respective positions at which the available satellites are located.

5. The method according to claim 2, wherein weights for weighting the first error and for weighting the second error are found through training.

6. The method according to claim 5, wherein the training involves simulating manoeuvring of the vehicle using an error-free positioning system as reference and measuring how much the accuracy of the CRLS based positioning system and the accuracy of the GNSS based positioning system differ from the error-free positioning system.

7. The method according to claim 6, wherein the manoeuvring is simulated according to different scenarios with varying conditions for the CRLS based positioning system and the GNSS based positioning system, respectively.

8. The method according to claim 6, wherein the manoeuvring is simulated by means of real-world experimenting.

9. The method according to claim 1, wherein the first error is related to a minimum matching error between the position of the vehicle as given by the CRLS based positioning system before and after movement of the vehicle.

10. The method according to claim 1, wherein the first error is determined by the least squares error resulting from a difference between a first distance pattern measured by the CRLS based positioning system for a first position of the vehicle and a distance pattern estimated by the CRLS based positioning system for a second position of the vehicle.

11. The method according to claim 1, wherein the second error is proportional to the minimum matching error of the position of the vehicle as given by the GNSS based positioning system for different satellites utilized by the GNSS based positioning system.

12. The method according to claim 1, wherein the second error is determined by the least squares error resulting from solving a trilateration problem of the GNSS based positioning system.

13. A controller for Autonomous Driving, AD, or at least Advanced Driver Assisted System, ADAS, aided manoeuvring of a vehicle, the controller comprising processing circuitry, the processing circuitry being configured to cause the controller to:
    select between using a Camera/Radar/Lidar/Sonar ("CRLS") based positioning system and a Global Navigation Satellite System "(GNSS") based positioning system for aiding manoeuvring of the vehicle, wherein which positioning system to select is based on comparing a first error determined for the CRLS based positioning system to a second error determined for the GNSS based positioning system, and wherein the positioning system with smallest error is selected, wherein the smallest error is selected by checking, for each position of the vehicle where positioning information is gathered, whether the position given by the CRLS based positioning system or the GNSS based positioning system is more accurate; and aid the manoeuvring of the vehicle using the selected positioning system, wherein the manoeuvring pertains to reversing of the vehicle.

14. A non-transitory computer readable storage medium storing a computer program, the computer program comprising computer code which, when run on processing circuitry of a controller, causes the controller to:
    select between using a Camera/Radar/Lidar/Sonar ("CRLS") based positioning system and a Global Navigation Satellite System ("GNSS") based positioning system for aiding manoeuvring of the vehicle, wherein which positioning system to select is based on comparing a first error determined for the CRLS based positioning system to a second error determined for the GNSS based positioning system, and wherein the positioning system with smallest error is selected, wherein the smallest error is selected by checking, for each position of the vehicle where positioning information is gathered, whether the position given by the CRLS based positioning system or the GNSS based positioning system is more accurate; and
    aid the manoeuvring of the vehicle using the selected positioning system, wherein the manoeuvring pertains to reversing of the vehicle.

* * * * *